L. J. MONAHAN.
GRASS TWINE MACHINE.
APPLICATION FILED SEPT. 7, 1909.
956,539.
Patented May 3, 1910.
3 SHEETS—SHEET 1.
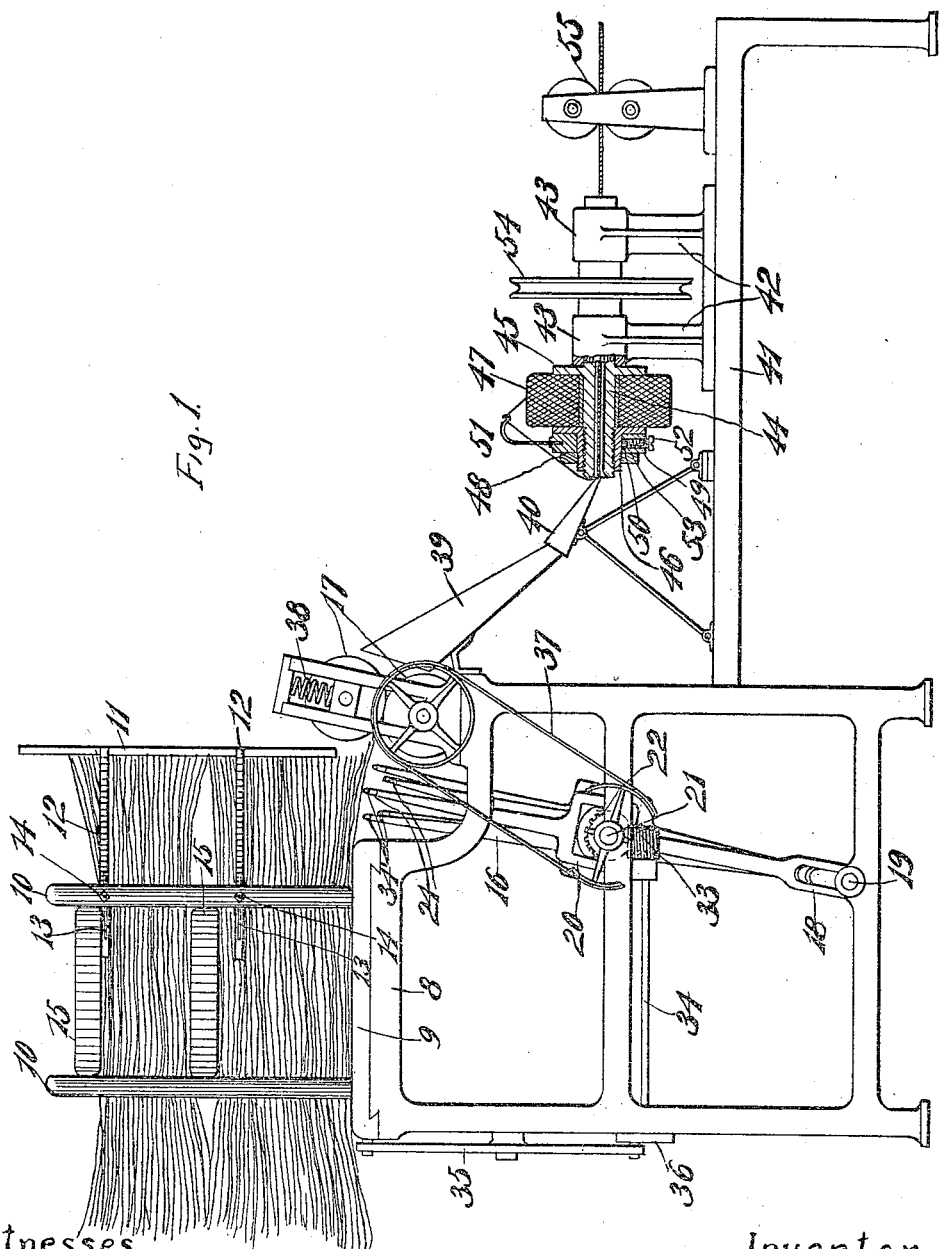
Witnesses.
Inventor.
Louis J. Monahan
By Benedict, Morsell & Caldwell
Attorneys L. J. MONAHAN.
GRASS TWINE MACHINE.
APPLICATION FILED SEPT. 7, 1909.
956,539.
Patented May 3, 1910.
3 SHEETS—SHEET 2.
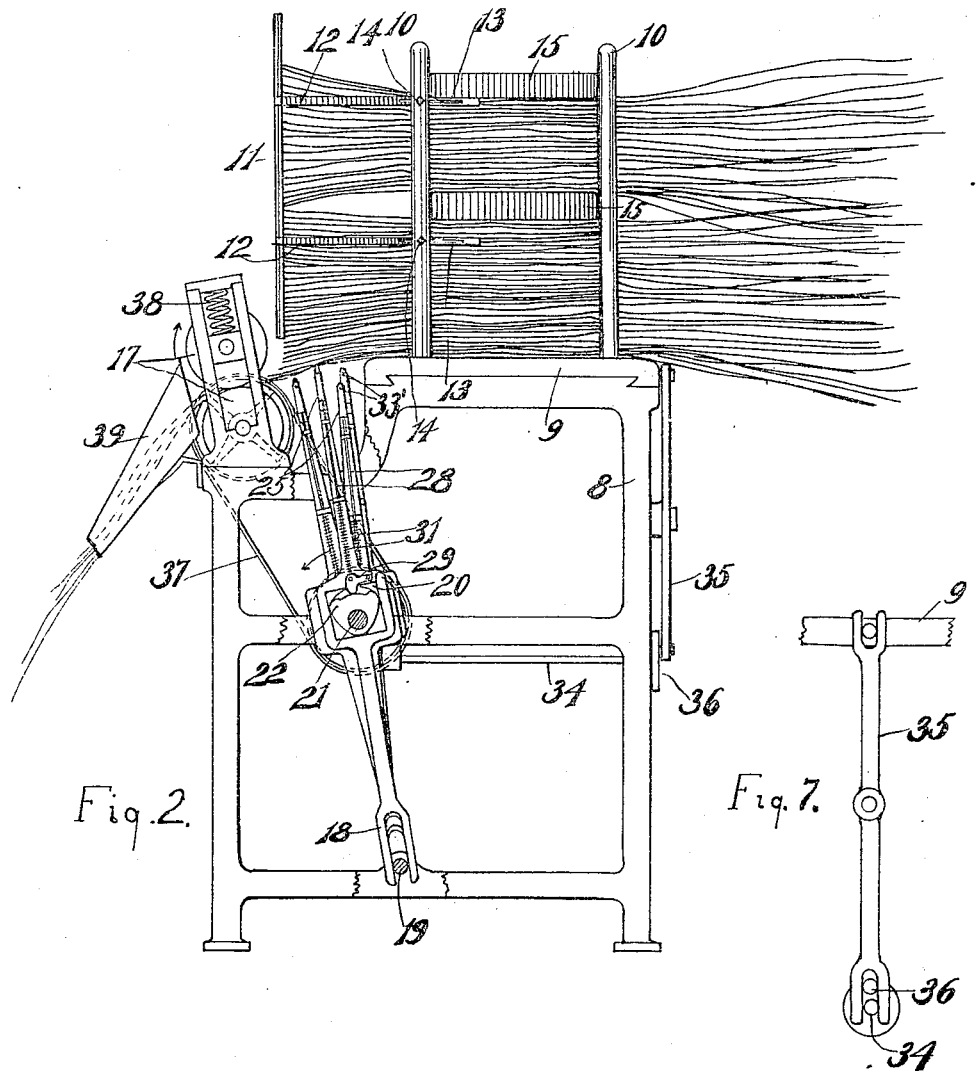
Witnesses:
Inventor:
Louis J. Monahan
By Benedict, Morsell & Caldwell
Attorneys

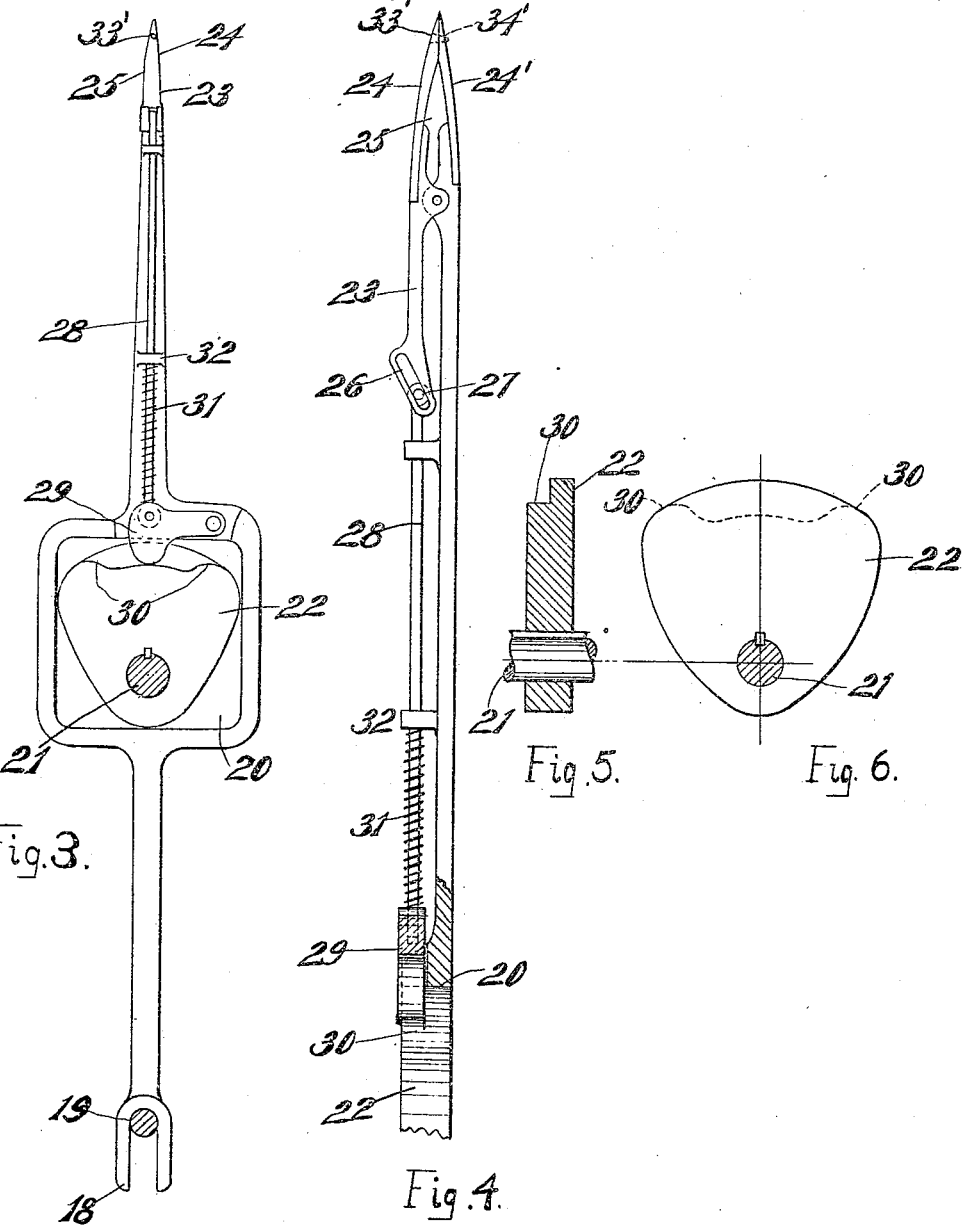

UNITED STATES PATENT OFFICE.

LOUIS J. MONAHAN, OF OSHKOSH, WISCONSIN.

GRASS-TWINE MACHINE.

956,539.

Specification of Letters Patent.

Patented May 3, 1910.

Application filed September 7, 1909. Serial No. 516,444.

*To all whom it may concern:*

Be it known that I, LOUIS J. MONAHAN, residing in Oshkosh, in the county of Winnebago and State of Wisconsin, have invented new and useful Improvements in Grass-Twine Machines, of which the following is a description, reference being had to the accompanying drawings, which are a part of this specification.

This invention relates to improvements in grass twine machines for forming twine of grass or other material of a similar nature, the invention being more particularly, although not entirely, directed to the means for feeding the grass or like material to the winding portion of the machine.

One of the objects of the invention is to provide a grass twine machine which is simple in construction and operation and which is adapted to perform with despatch all of the functions desired in a sure and reliable manner.

A further object of the invention is to provide a grass twine machine which will require but a minimum amount of manual labor to operate the same.

A further object of the invention is to provide a grass twine machine which is so constructed that it is only necessary to place the grass or other material, to be formed into twine, into the holder and without further manual labor the machine will continue to withdraw material from the supply until it is exhausted and by keeping the holder supplied the machine will continue to form twine.

A further object of the invention is to provide a grass twine machine with improved means for successively grasping and withdrawing portions of the material from the holder to feed it to the winding portions of the machine.

A further object of the invention is to provide a twine wrapping mechanism which is adapted to wrap twine around the material and to preserve an even predetermined adjustable tension at all times on the twine.

In the accompanying drawings in which the same reference characters indicate the same parts in all of the views; Figure 1 is a side view of the complete grass twine machine, a part of the winding mechanism being shown in section to illustrate interior construction; Fig. 2 is a side view of the opposite side of a portion of the grass twine machine, parts broken away to show interior construction; Fig. 3 is an enlarged side view of one of the nippers and the cam for operating the same; Fig. 4 is an edge view of a portion of one of the nippers on a still larger scale; Fig. 5 is a sectional detail view of one of the nipper operating cams; Fig. 6 is a side view of one of the nipper cams and a fragment of the shaft; and Fig. 7 is a detailed view of the lever for moving the slidable bed.

Referring to the drawings the numeral 8 indicates the main or feed frame of the machine which may be of any suitable form to support the operating mechanism and 9 a slidable bed or carriage mounted thereon and adapted to be moved transversely across the frame a limited distance by means to be described later. The carriage is provided with upstanding rods 10 at each end thereof and spaced a suitable distance apart to form sides to the carriage to hold the material. A flat stop plate 11 connected to the upstanding rods 10 on the front side of the machine by means of connecting bars 12 is adapted to properly position the butt ends of the grass or material being formed into twine. These connecting bars are provided with elongated slots 13 and are connected to the upstanding rods by bolts 14 passing through said slots and engaging the rods to permit the stop plate being raised or lowered or moved nearer to or farther from the rods to adjust the position thereof. The carriage, rods and the stop plate form a box like holder or hopper for holding the material to be used and which is held in position under slight compression by means of weights 15 resting on top of the material and extending transversely across the hopper and between the upstanding rods for convenient removal when the material beneath each weight has been almost entirely removed.

The upper ends of a series of nipper members 16 are positioned and constructed to travel in a path beneath the butt ends of the material and parallel with relation thereto. These nippers are adapted to grasp portions of the material during the forward stroke thereof and carry it forward to a position between yielding feed rollers 17 which will completely withdraw the material from beneath the main body of material. The forked lower ends 18 of the nipper members loosely engage a stationary shaft 19 extending transversely across the frame 8 to permit said members to freely turn and slide on said shaft. The medial portions of the nipper members are enlarged and provided with rectangular openings 20 through which extends a revoluble shaft 21 mounted on the main frame of the machine. Cams 22 rigidly connected to the revoluble shaft are positioned to engage the inner walls of the portions of the members forming the rectangular openings to oscillate said members. The upper ends of the nipper members are provided with pivoted levers 23 and the upper ends of these levers and also the members have steel jaws 24 and 24′ connected thereto to form nippers 25. The lower ends of the levers have elongated angularly positioned slots 26 which are engaged by pins 27 fastened to reciprocating rods 28 slidably connected to the nipper members. Cam levers 29 pivoted to the enlarged portions of the nipper members and also to the lower ends of the reciprocating rods 28 are positioned to bear on the cams 22 portions of which are shaped to form auxiliary cams 30 to reciprocate the rods 28 and open the nippers 25 so they will engage the material. These cams are so positioned with relation to each other and the successive movements of the nipper arms that the jaws thereof will be opened at predetermined points to grasp the material during the rearward stroke and said jaws will close and grasp the material during the forward stroke. Coiled springs 31 surrounding the reciprocating rods 28 and interposed between the cam levers 29 and guide lugs 32 are adapted to keep the cam levers in constant contact with the cams. The upper ends of the jaws 24 have pins 33′ projecting therefrom which extend into openings 34′ provided in the companion jaws 24′ to allow only a small portion of the material to enter between the jaws when open.

The carriage 9 is adapted to be moved back and forth on the frame while material is being withdrawn therefrom by means of a worm wheel connection 33 between the revoluble shaft 21 and a worm wheel shaft 34 mounted on the frame, and extending at right angles thereto and a lever 35 medially pivoted to the frame and connected at its upper end to the carriage and having a connection at its lower end with a crank 36 forming part of the worm wheel shaft 34.

The lower roller of the pair of feed rollers 17 is driven by a belt connection 37 with the revoluble shaft 21 and the upper feed roller is driven by frictional contact with the lower roller. Coiled springs 38 serve to hold the two rollers, yieldingly, in frictional engagement with each other. These rollers are adapted to grasp the material fed therebetween by the nipper members and complete the operation of withdrawing it from the carriage.

An inclined trough 39 converging together at its lower end to form a discharge end of reduced area is positioned in front of the feed rollers to catch and direct the material discharged from the feed rollers to a funnel 40 which converges and compresses the material together so that it is discharged from the lower end thereof in the form of twine to the twine wrapping mechanism in line with the lower open end of the funnel.

Referring to the twine wrapping mechanism, the numeral 41 indicates a supplemental frame which is connected to the main frame and has mounted thereon the twine wrapping mechanism consisting of a base having standards 42 extending upwardly therefrom and provided with bearings 43. In these bearings is journaled a tubular shaft 44 provided with an annular shoulder 45 and a shouldered collar 46 threaded to the shaft. A ball of wrapping twine 47 placed on the shaft is interposed between these collars and its outer end extends to a position to be wound around the material discharged from the funnel and passing through the tubular shaft. The threaded collar provides for placing a new ball of twine on the shaft. As the diameter of the ball of twine constantly decreases in diameter as the twine is unwound therefrom it is necessary to provide means to compensate for the difference in the length of twine unwound during each revolution of the shaft, the speed of which is constant, in order to unwind substantially the same length of twine during each revolution. This is accomplished by means of the tension device 48 which consists of the tension collar 49 mounted on the shouldered collar 47 and provided with a spring fiber friction pin 50 and a spring arm 51 having a hook formed at its outer end over which the twine passes. The frictional engagement of the tension collar with the shouldered collar is adjusted by means of the adjusting bolt 52 which is adapted to increase or diminish the tension of the spring 53 and consequently the pressure of the fiber pin 50 with the shouldered collar. This tension device is adapted to exert a predetermined strain on the twine in winding the material and to also unwind the twine only as fast as it is wound around the material. The twine wrapping mechanism is rotated by means of a belt pulley 54 fast on the tubular shaft and driven from a source of motion. The wrapped material is drawn through the tubular shaft by means of friction wheels 55 mounted on the supplemental frame and between which the twine extends.

The operation of the machine is as follows: The cam shaft is driven at a suitable rate of speed by means of a belted connection from a source of motion and the feed rollers are in turn driven by the belted connection with the cam shaft. A quantity of grass, hay, straw or other material is placed on the carriage between the upstanding rods and the ends of the material bear against the stop plate as shown in Figs. 1 and 2 and a weight is placed on top of the material to hold it in position. Another bundle of the material used is then placed on top of the weight and the first lot of material and another weight placed on top of this material and as the material beneath each weight is used the weight may be drawn out endwise between the rods while the machine is in operation. The stop plate is adjusted to the proper distance from the rollers and positioned a suitable height above the plane of travel of the nippers. The nipper members which are arranged to move forwardly and rearwardly in successive order by the cams are adapted to grasp parts of the grass or material by means of the nipper jaws and move it forwardly to a position between the feed rollers where it will be further moved thereby, the nipper jaws of course releasing the material when it is engaged by the feed rollers. As the nipper members successively feed the material to the feed rollers a continuous stream of material is delivered between the feed rollers which in turn deliver it into the converging trough and is guided therefrom to the funnel which converges and delivers it to the twine wrapping mechanism also in a continuous stream in the form of a twine. The carriage is caused to reciprocate back and forth so that the nipper jaws enter a new place in the material at each stroke. It will be seen that the action of the nipper members and the peculiar shape of the cams causes the nippers to travel in a substantially direct line during their forward working stroke and to return quickly during the idle stroke thereof as the cams travel over their lower center. The movements of the nipper jaws are timed accurately by the shape of the auxiliary cams to grasp and release the material at the proper points of their travel between the carriage and the feed rollers. The material in the form of a twine discharged from the funnel enters the tubular shaft of the twine wrapping mechanism and is wrapped with twine as it enters said shaft and the finished twine is drawn through said tubular shaft by means of the friction wheels. The tubular shaft and the ball of twine which is continuously rotated around the material winds or wraps said twine around the material to form a continuous firm twine of said material and in winding, the tension device serves to keep an equal strain at all times on the twine regardless of the diameter of the ball of twine.

From the foregoing description it will be seen that the machine is very simple in operation and construction and is substantially automatic in its operations.

What I claim as my invention is:—

1. A grass twine machine, comprising a main frame, a reciprocating carriage mounted on the main frame, means for reciprocating the carriage, feed rollers positioned adjacent to the carriage, means for rotating the feed rollers, nippers adapted and constructed to grasp material carried by the carriage and move it to a position to be engaged by the feed rollers, means for oscillating the nippers, and means for separating the nipper jaws.

2. A grass twine machine, comprising a main frame, a reciprocating carriage mounted on the main frame, means for reciprocating the carriage, feed rollers positioned adjacent to the carriage, means for rotating the feed rollers, nippers adapted and constructed to grasp material carried by the carriage and move it to a position to be engaged by the feed rollers, means for oscillating the nippers, and cams for separating the nipper jaws.

3. A grass twine machine, comprising a main frame, a reciprocating carriage mounted on the main frame, means for reciprocating the carriage, feed rollers positioned adjacent to the carriage, means for rotating the feed rollers, nippers adapted and constructed to grasp material carried by the carriage and move it to a position where it will be engaged by the rollers, means for oscillating the nippers, cams for separating the nipper jaws, means for receiving and converging material engaged by the rollers, and a mechanism for wrapping twine around the converged material.

4. A grass twine machine, comprising a main frame, a reciprocating carriage mounted on the main frame, means for reciprocating the carriage, feed rollers mounted on the main frame adjacent to the carriage, means for rotating the feed rollers, a plurality of nippers pivotally and slidably connected to the main frame, cams mounted on the frame for operating said nippers to cause them to grasp material carried by the carriage and move it to a position where it will be engaged by the rollers, means for rotating said cams, means for receiving and converging material engaged by the rollers, and a tubular shaft positioned to receive the converged material and provided with means for winding a twine therearound.

5. A grass twine machine, comprising a main frame, a reciprocable carriage mounted on the frame, means for reciprocating said carriage, feed rollers mounted on the frame adjacent to the carriage, means for reciprocating the carriage, a plurality of nipper members pivotally mounted on the frame, cams mounted on the frame for oscillating said members, material grasping levers pivotally connected to said members, auxiliary cams mounted on the frame for operating said levers, a twine wrapping mechanism, and a converging means for receiving material from the feed rollers and directing it to the twine wrapping mechanism.

6. A grass twine machine, comprising a main frame, a reciprocable carriage mounted on the frame, a lever connection for reciprocating the carriage, feed rollers mounted on the frame adjacent to the carriage, a plurality of nipper members provided with slotted lower ends and with medial rectangular openings, a stationary shaft extending through the slots of the members, a revoluble shaft extending through the rectangular openings and mounted on the frame, cams fastened to the revoluble shaft and in engagement with the walls of the members forming the rectangular openings, a motion transmission means between the revoluble shaft and one of the feed rollers, material grasping levers pivotally connected to said members, auxiliary cams carried by the revoluble shaft for operating said levers, a twine wrapping mechanism, and a converging means for receiving material from the feed rollers and directing it to the twine wrapping mechanism.

7. A grass twine machine, comprising a main frame, a reciprocable carriage mounted on the frame, a lever connection for reciprocating the carriage, feed rollers mounted on the frame adjacent to the carriage, a plurality of nipper members provided with slotted lower ends and with medial rectangular openings, a stationary shaft extending through the slots of the members, a revoluble shaft extending through the rectangular openings and mounted on the frame, cams fastened to the revoluble shaft and in engagement with the walls of the members forming the rectangular openings, a motion transmission means between the revoluble shaft and one of the feed rollers, material grasping levers pivotally connected to said members, auxiliary cams carried by the revoluble shaft for operating said levers, means for receiving and converging material engaged by the feed rollers, a tubular shaft through which the converged material travels, and a twine wrapping mechanism mounted on the tubular shaft and adapted and constructed to wrap twine around the converged material passing through the tubular shaft.

8. A grass twine machine, comprising a main frame, a reciprocable carriage mounted on the frame, a lever connection for reciprocating the carriage, feed rollers mounted on the frame adpacent to the carriage, a plurality of nipper members provided with slotted lower ends and with medial rectangular openings, a stationary shaft extending through the slots of the members, a revoluble shaft extending through the rectangular openings and mounted on the frame, cams fastened to the revoluble shaft and in engagement with the walls of the members forming the rectangular openings, a motion transmission means between the revoluble shaft and one of the feed rollers, material grasping levers pivotally connected to said members, auxiliary cams carried by the revoluble shaft for operating said levers, an inclined trough converged at its lower end for receiving and converging material engaged by the feed rollers, a tubular shaft through which the converged material travels and constructed to carry a ball of twine, a collar surrounding said tubular shaft and provided with a spring arm adapted and constructed to revolve around the ball of twine, and a yielding member carried by the collar and having frictional engagement with the tubular shaft to retard the movement of the collar.

9. A grass twine machine, comprising a main frame, a reciprocable carriage mounted on the frame, a lever connection for reciprocating the carriage, feed rollers mounted on the frame adjacent to the carriage, a plurality of nipper members provided with slotted lower ends and with medial rectangular openings, a stationary shaft extending through the slots of the members, a revoluble shaft extending through the rectangular openings and mounted on the frame, cams fastened to the revoluble shaft and in engagement with the walls of the members forming the rectangular openings, a motion transmission means between the revoluble shaft and one of the feed rollers, material grasping levers pivotally connected to said members, auxiliary cams carried by the revoluble shaft for operating said levers, an inclined trough converged at its lower end for receiving and converging material engaged by the feed rollers, a tubular shaft through which the converged material travels, a collar formed on said shaft, a shouldered collar threaded to the shaft, said shaft constructed to carry a ball of twine interposed between the two collars, a tension collar mounted on the shouldered collar and provided with a spring arm adapted and constructed to revolve around the ball of twine, and a yielding adjustable member carried by the tension collar and having frictional engagement with the shouldered collar to retard movement of the tension collar.

10. A grass twine machine, comprising a main frame, a reciprocable carriage mounted on the frame, a lever connection for reciprocating the carriage, feed rollers mounted on the frame adjacent to the carriage, a plurality of nipper members provided with slotted lower ends and with medial rectangular openings, a stationary shaft extending through the slots of the members, a revoluble shaft extending through the rectangular openings and mounted on the frame, cams fastened to the revoluble shaft and in engagement with the walls of the members forming the rectangular openings, a motion transmission means between the revoluble shaft and one of the feed rollers, material grasping levers pivotally connected to said members, auxiliary cams carried by the revoluble shaft for operating said levers, an inclined trough converged at its lower end for receiving and converging material engaged by the feed rollers, a tubular shaft through which the converged material travels, a collar formed on said shaft, a shouldered collar threaded on the shaft, said shaft constructed to carry a ball of twine interposed between the two collars, a tension collar mounted on the shouldered collar and provided with a spring arm adapted and constructed to revolve around the ball of twine and with a threaded opening, a friction pin positioned in said opening and having frictional engagement with the shouldered collar to retard the movement of the tension collar, an adjusting screw positioned in the opening and threaded to the collar, and a coiled spring interposed between the adjusting screw and the friction pin.

11. A grass twine machine, comprising a main frame, a reciprocable carriage mounted on the frame, upstanding rods connected to said carriage, a stop plate adjustably connected to said rods, a lever connection for reciprocating the carriage, yielding feed rollers mounted on the frame adjacent to the carriage, a plurality of nipper members provided with slotted lower ends and with medial rectangular openings, a stationary shaft extending through the slots of the members, a revoluble shaft extending through the rectangular openings and mounted on the frame, cams fastened to the revoluble shaft and in engagement with the walls of the members forming the rectangular openings, a motion transmission means between the revoluble shaft and one of the feed rollers, material grasping levers provided with angularly positioned slots pivotally connected to said members, rods slidably mounted on said members and having a sliding connection with the slotted portions of the material grasping fingers, cam levers pivotally connected to the nipper members and having an operative connection with the slidable rods, and auxiliary cams carried by the revoluble shaft for operating the cam levers.

12. A grass twine machine, comprising a main frame, a reciprocable carriage mounted on the frame, upstanding rods connected to said carriage, a stop plate adjustably connected to said rods, a lever connection for reciprocating the carriage, yielding feed rollers mounted on the frame adjacent to the carriage, a plurality of nipper members provided with slotted lower ends and with medial rectangular openings, a stationary shaft extending through the slots of the members, a revoluble shaft extending through the rectangular openings and mounted on the frame, cams fastened to the revoluble shaft and in engagement with the walls of the members forming the rectangular openings, a motion transmission means between the revoluble shaft and one of the feed rollers, material grasping levers provided with angularly positioned slots pivotally connected to said members, rods slidably mounted on said members and having a sliding connection with the slotted portions of the material grasping fingers, cam levers pivotally connected to the nipper members and having an operative connection with the slidable rods, auxiliary cams carried by the revoluble shaft for operating the cam levers, a shaft mounted on the frame and having a connection with the revoluble shaft and with the lever connection for reciprocating the carriage, and a twine wrapping mechanism for wrapping twine around material passed between the feed rollers.

13. A grass twine machine, comprising a main frame, a reciprocable carriage mounted on the frame, upstanding rods connected to said frame, a stop plate adjustably connected to said rods, a lever connection for reciprocating the carriage, yielding feed rollers mounted on the frame adjacent to the carriage, a plurality of nipper members provided with slotted lower ends and with medial rectangular openings, a stationary shaft extending through the slots of the members, a revoluble shaft extending through the rectangular openings and mounted on the frame, cams fastened to the revoluble shaft and in engagement with the walls of the members forming the rectangular openings, a motion transmission means between the revoluble shaft and one of the feed rollers, material grasping levers provided with angularly positioned slots pivotally connected to said members, rods slidably mounted on said members and having a sliding connection with the slotted portions of the material grasping fingers, cam levers pivotally connected to the nipper members and having an operative connection with the slidable rods, auxiliary cams carried by the revoluble shaft for operating the cam levers, a shaft mounted on the frame and having a connection with the revoluble shaft and with the lever connection for reciprocating the carriage, means for receiving and converging material engaged by the feed rollers, a tubular shaft through which the converged material travels, said shaft constructed to carry a ball of twine for wrapping said material, a collar surrounding said tubular shaft and provided with a spring arm adapted and constructed to revolve around the ball of twine, and a yielding member carried by the collar and having frictional engagement with the tubular shaft to retard the movement of the collar.

In testimony whereof, I affix my signature, in presence of two witnesses.

LOUIS J. MONAHAN.

Witnesses:
   BART W. HEISS,
   EDWARD J. DEMPSEY.